Aug. 26, 1952          H. H. MORRIS          2,608,033
APPARATUS FOR MULTIPLE GRINDING
Filed Dec. 22, 1950          9 Sheets-Sheet 1
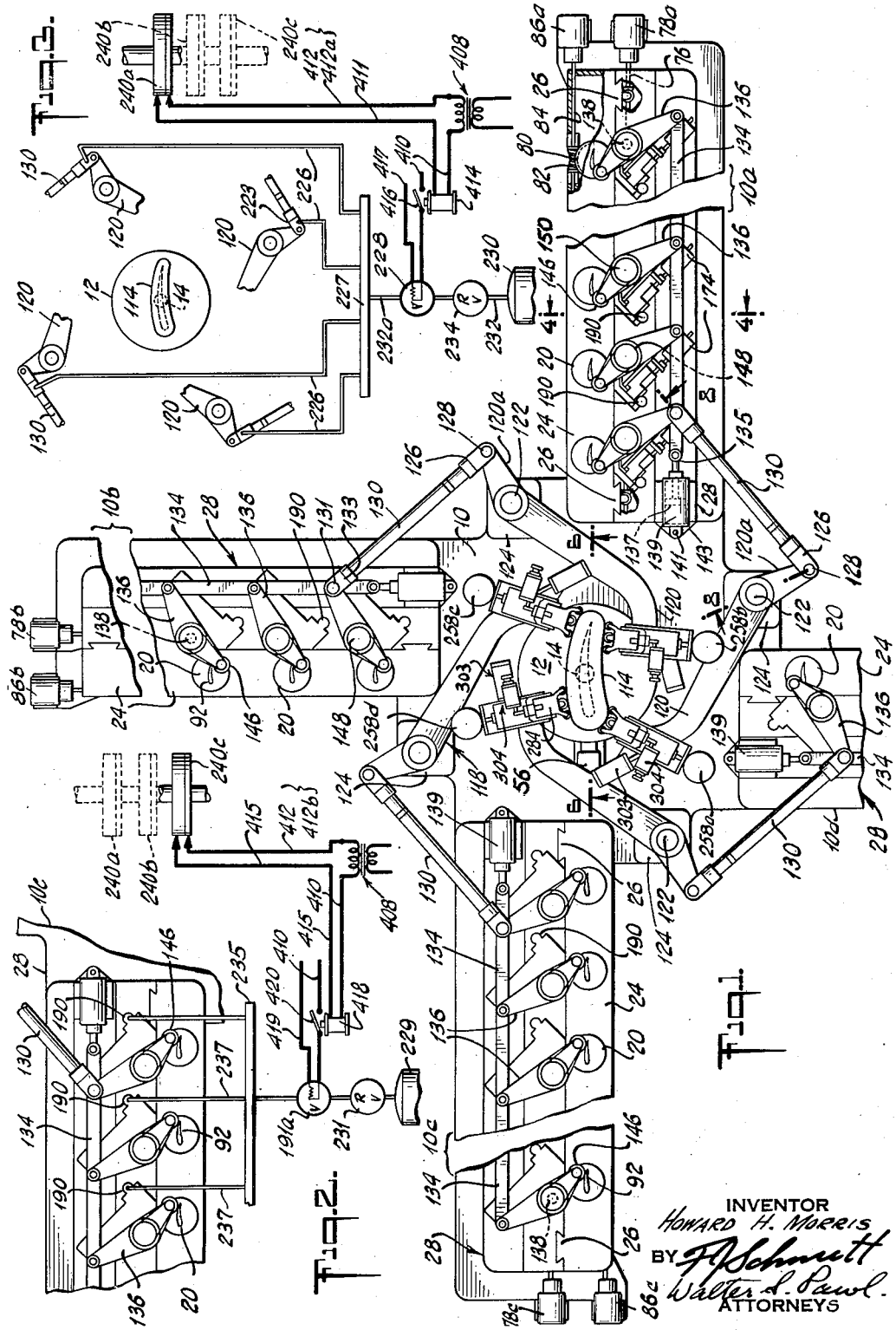
INVENTOR
HOWARD H. MORRIS
BY
ATTORNEYS

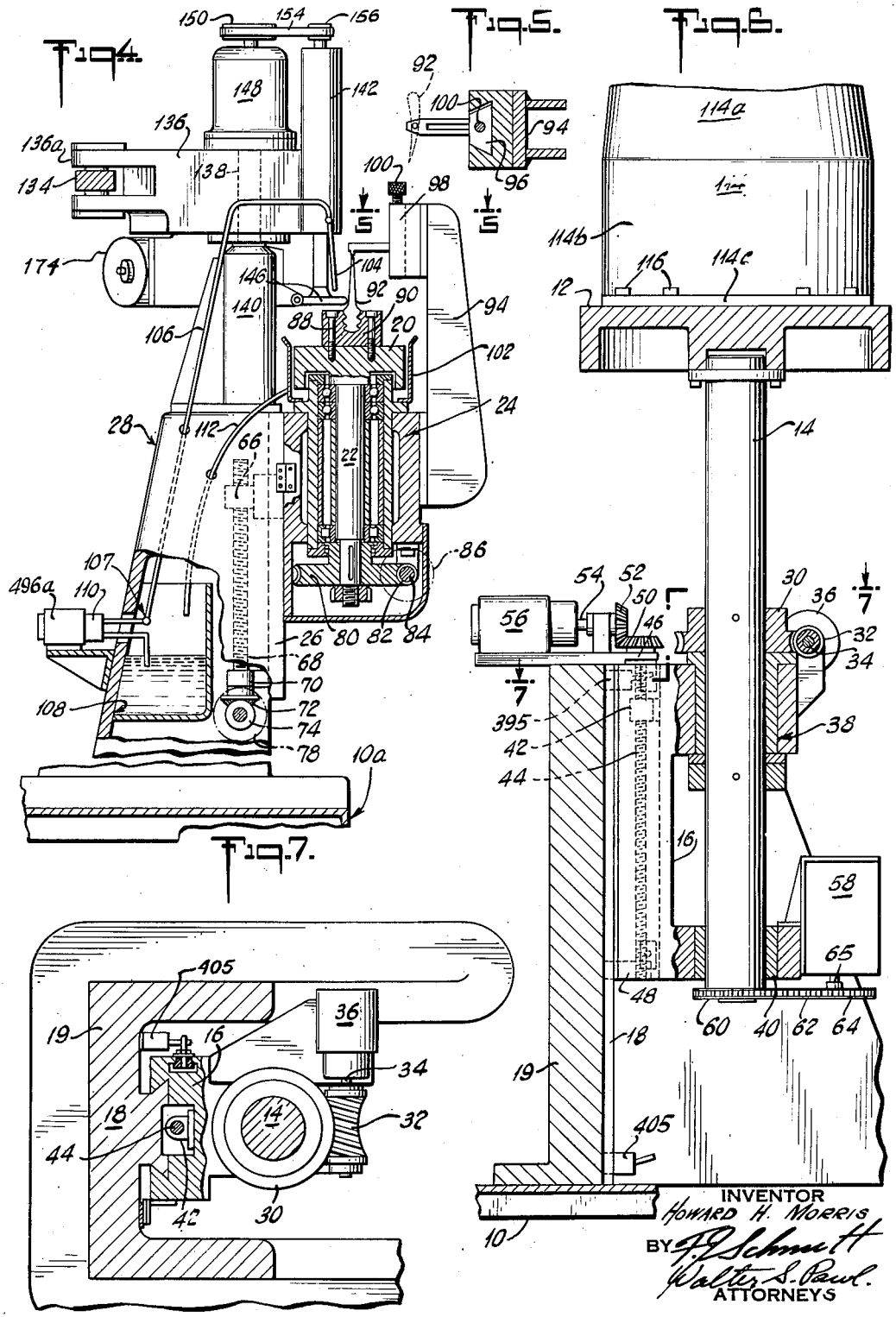

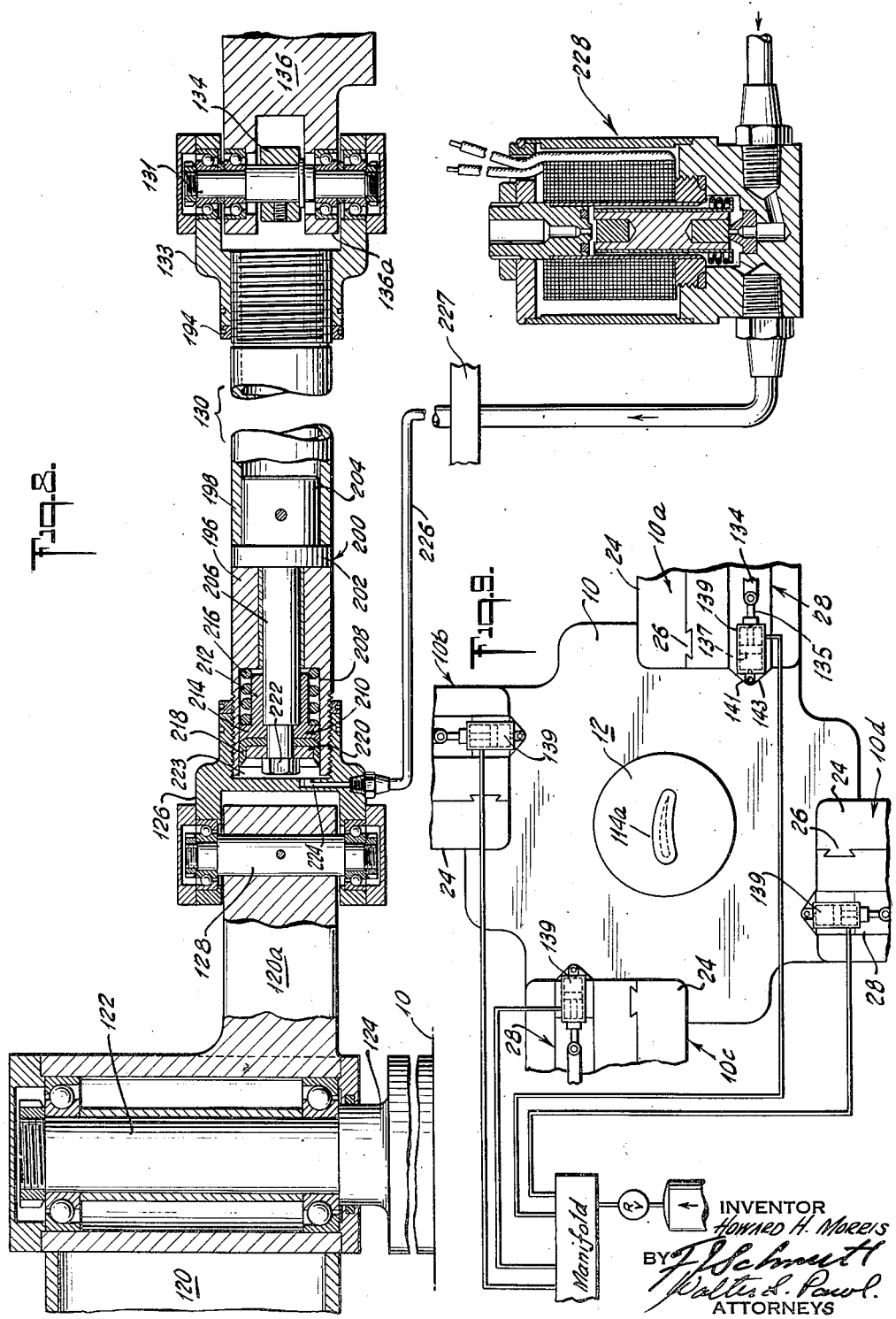

Aug. 26, 1952  H. H. MORRIS  2,608,033
APPARATUS FOR MULTIPLE GRINDING
Filed Dec. 22, 1950  9 Sheets-Sheet 4

INVENTOR
Howard H. Morris
BY
ATTORNEYS

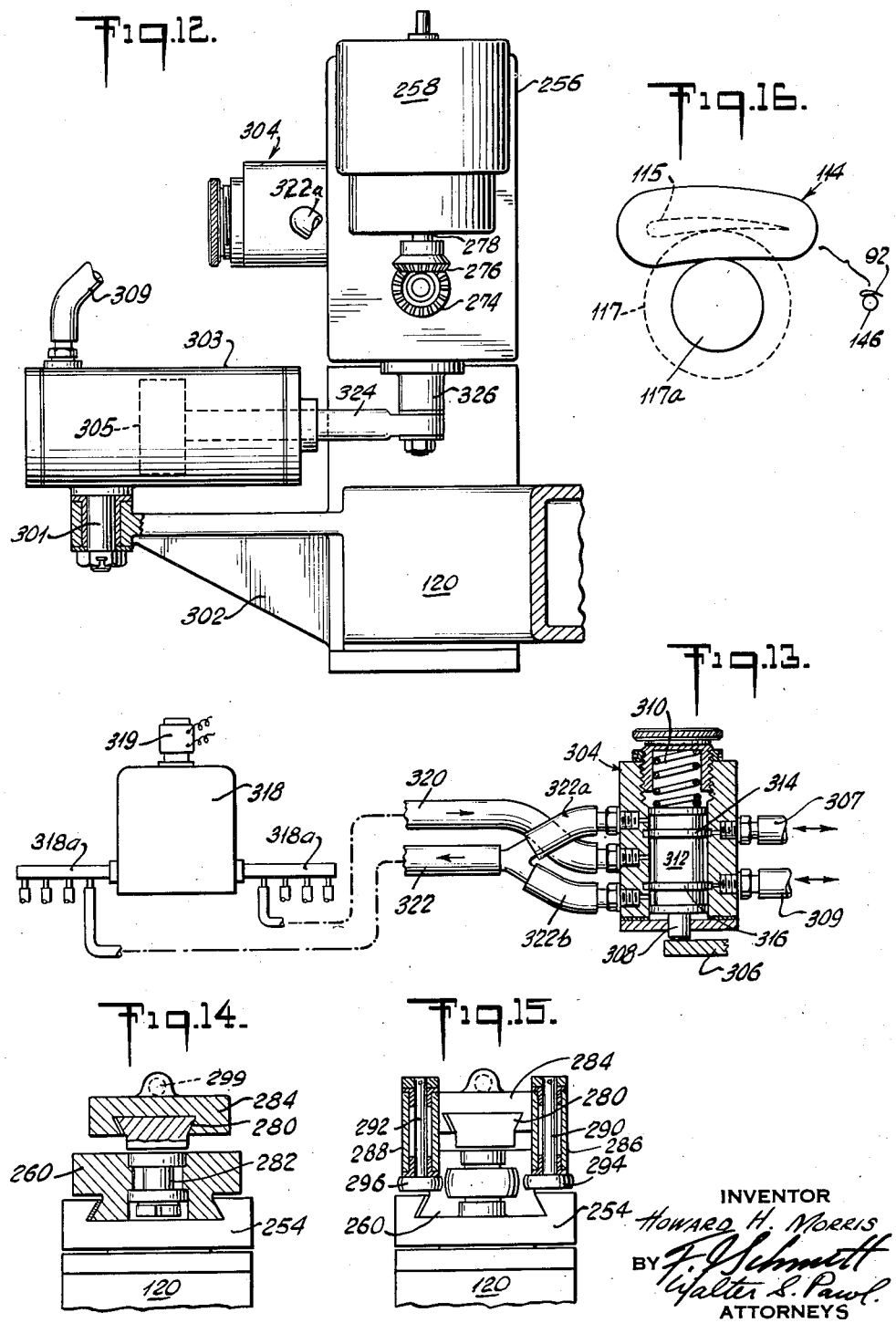

Aug. 26, 1952  H. H. MORRIS  2,608,033
APPARATUS FOR MULTIPLE GRINDING
Filed Dec. 22, 1950  9 Sheets-Sheet 6
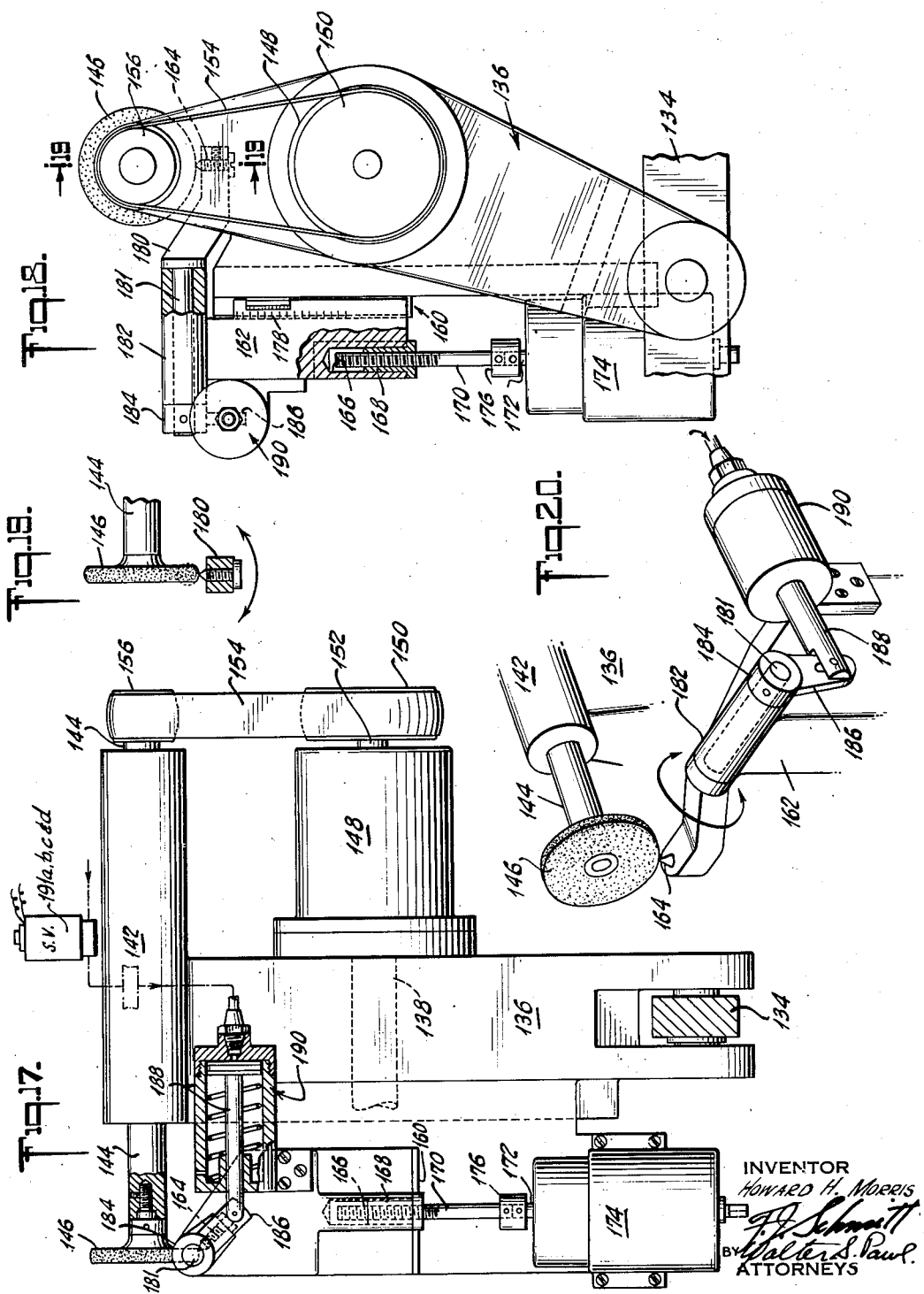
INVENTOR
HOWARD H. MORRIS
BY
ATTORNEYS Aug. 26, 1952 H. H. MORRIS 2,608,033
APPARATUS FOR MULTIPLE GRINDING
Filed Dec. 22, 1950 9 Sheets-Sheet 7
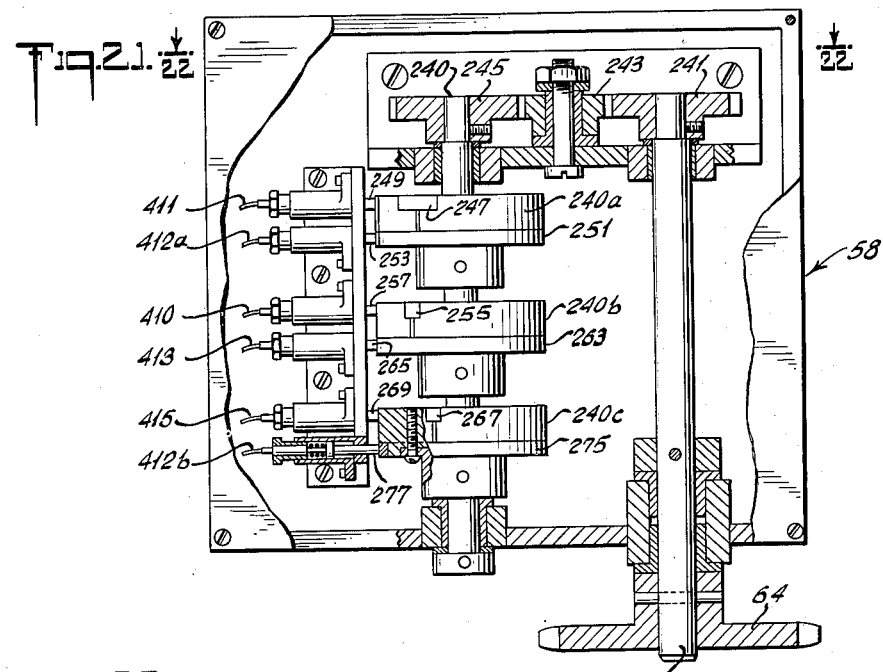
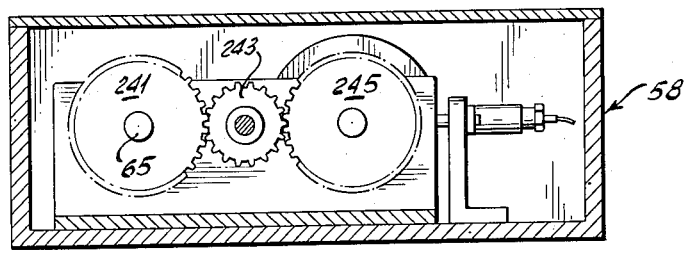
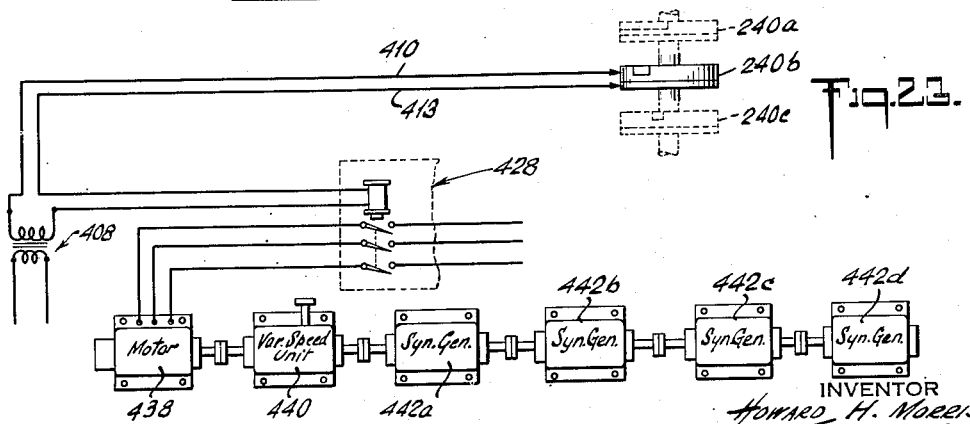
INVENTOR
HOWARD H. MORRIS
BY
ATTORNEYS

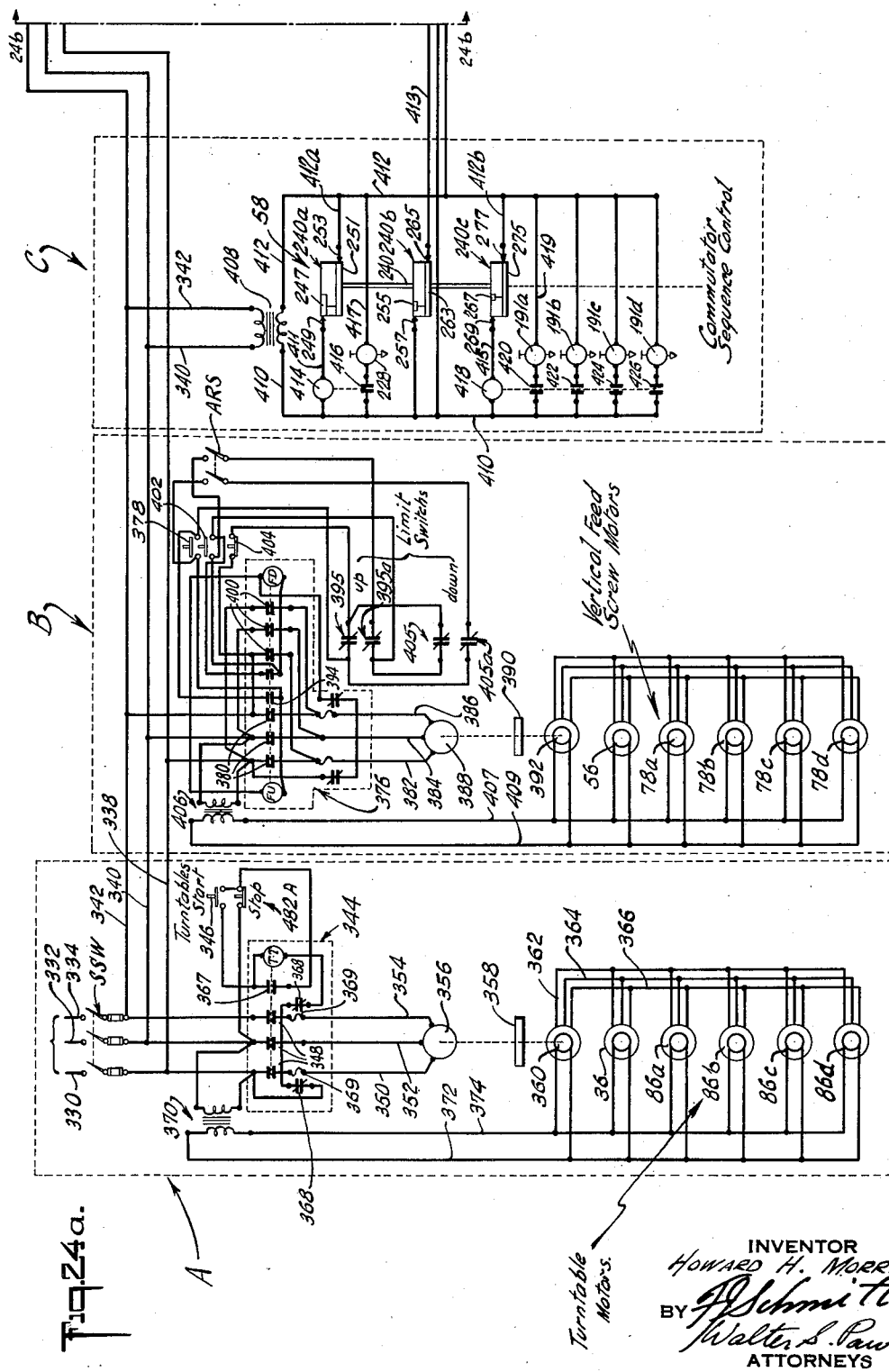

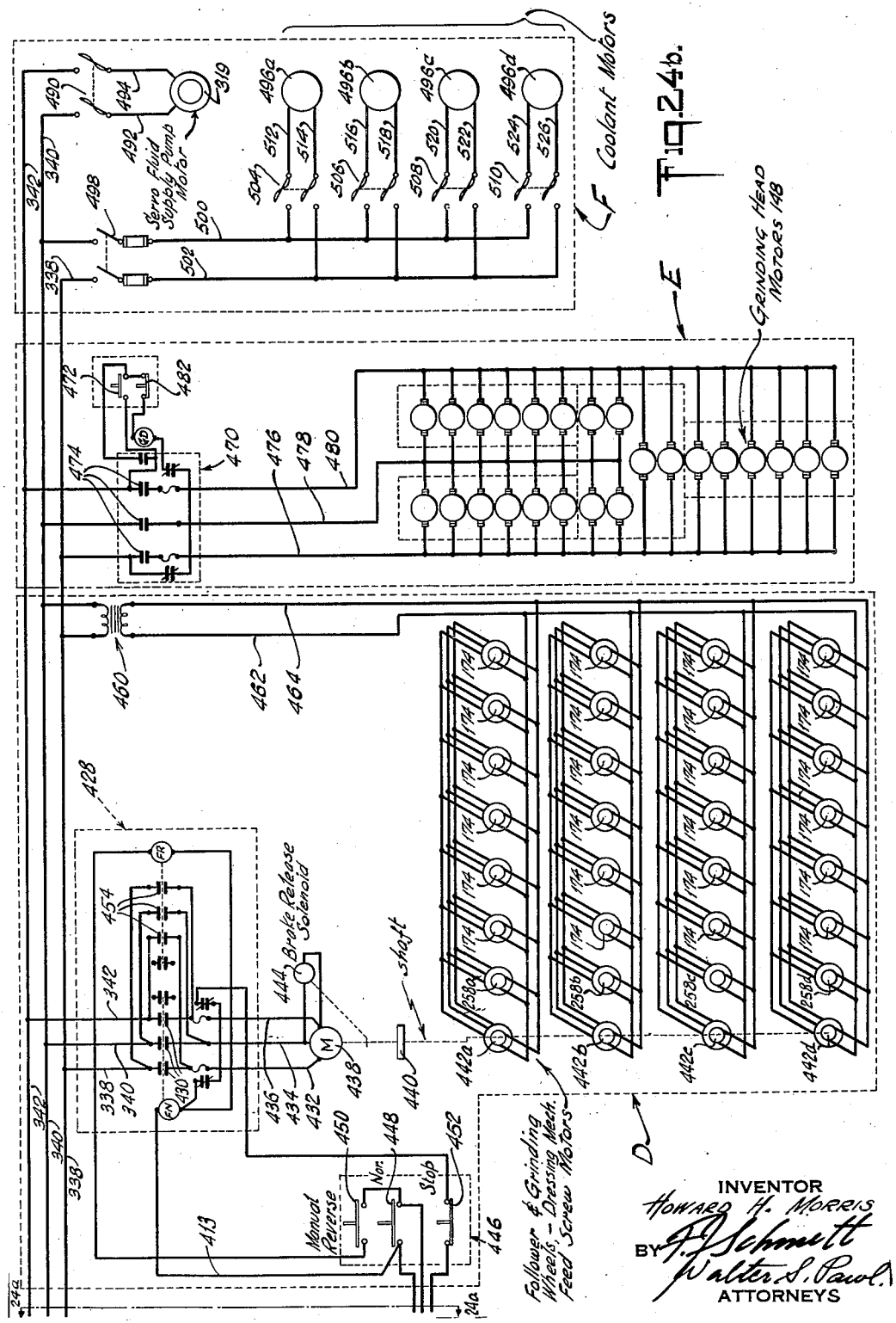

Patented Aug. 26, 1952

2,608,033

UNITED STATES PATENT OFFICE 2,608,033

APPARATUS FOR MULTIPLE GRINDING

Howard H. Morris, Hampton, Va.

Application December 22, 1950, Serial No. 202,279

22 Claims. (Cl. 51—101)

(Granted under the act of March 3, 1883, as amended April 30, 1928; 370 O. G. 757)

This invention relates to a machine tool for grinding a number of work pieces simultaneously. It is applicable, for example, to grind the surfaces of air foils and blades, such for example as are used in jet engines for aircraft propulsion, gas turbines, and the like. It is especially well adapted to finish-grind simultaneously a plurality of blades that have been forged or cast and which must be finished to more precise contour.

Difficulty has been encountered in this field due to the slowness of the finish-grind operation and its high cost. When attempting to finish-grind a plurality of blades simultaneously a major problem has been how to compensate for the wear on the grinding surfaces which causes receding of the grinding surfaces from the work pieces respectively and a change in the radii of the grinding surfaces relative to the follower.

An object of the invention is to provide a machine tool which is capable of simultaneously grinding a plurality of blades to close tolerances and at relatively low unit cost.

Another object of the invention is to provide means in a multiple grinder for maintaining the grinding wheels true and accurate in regard to contour and position with respect to a follower wheel.

Another object of the invention is to provide a multiple grinder with means for compensating for grinding wheel wear.

Other objects of the invention will be in part obvious or in part pointed out hereinafter.

The invention accordingly consists in the features of construction, combinations of elements, arrangements of parts, and in the several steps and relation and order of each of said steps, to one or more of the others thereof, all as will be pointed out in the following description, and the scope of the application of which will be indicated in the following claims.

The invention will best be understood if the following description is read in connection with the drawings, in which, Figure 1 is a top plan view of the embodiment of the grinding machine in which the master template and the work pieces are completely revolved;

Figure 2 is a fragmental plan view showing the cycle timing hook-up for controlling the means for dressing the grinding wheels;

Figure 3 is a fragmental side view of timing means for lengthening the connecting pantograph arms to retract the wheels from work during the grinding wheel dressing operation;

Figure 4 is a vertical cross section taken on the line 4—4 of Figure 1;

Figure 5 is a detail view taken on the line 5—5 of Figure 4;

Figure 6 is a vertical cross section taken on the line 6—6 of Figure 1;

Figure 7 is a top plan section taken on the line 7—7 of Figure 6;

Figure 8 is a horizontal section taken on the line 8—8 of Figure 1;

Figure 9 is a fragmental diagrammatic view of the air cylinders and pistons for maintaining the follower wheel in contact with the master template;

Figure 12 is an end elevation of Figure 11 looking in the direction of the arrow shown in connection with Figure 11;

Figure 13 is a detail view of the servo-control valve employed in Figures 10, 11 and 12;

Figure 14 is a vertical cross sectional view taken on the line 14—14 of Figure 11;

Figure 15 is a vertical cross section taken on the line 15—15 of Figure 11;

Figure 16 is a detailed view of an enlarged template and correspondingly reduced follower wheel;

Figure 17 is a side view of a grinding head;

Figure 18 is a plan view of the structure shown in Figure 17;

Figure 19 is a detailed view of a grinding wheel and its dressing or truing device taken on the line 19—19 of Figure 18;

Figure 20 is a perspective view of the portion of the grinding head shown in Figures 17 and 18;

Figure 21 is a side view of a commutator control box;

Figure 22 is a cross section taken on the line 22—22 of Figure 21;

Figure 23 is a diagrammatic view of a cycle timing hook-up for automatically starting and stopping the synchromotors shown by Figures 10, 11, 12, 17 and 18, which, in turn, operate feed screws etc.

Figure 24 is a wiring diagram. (Two sheets—Figures 24ᵃ and 24ᵇ).

Figure 10:
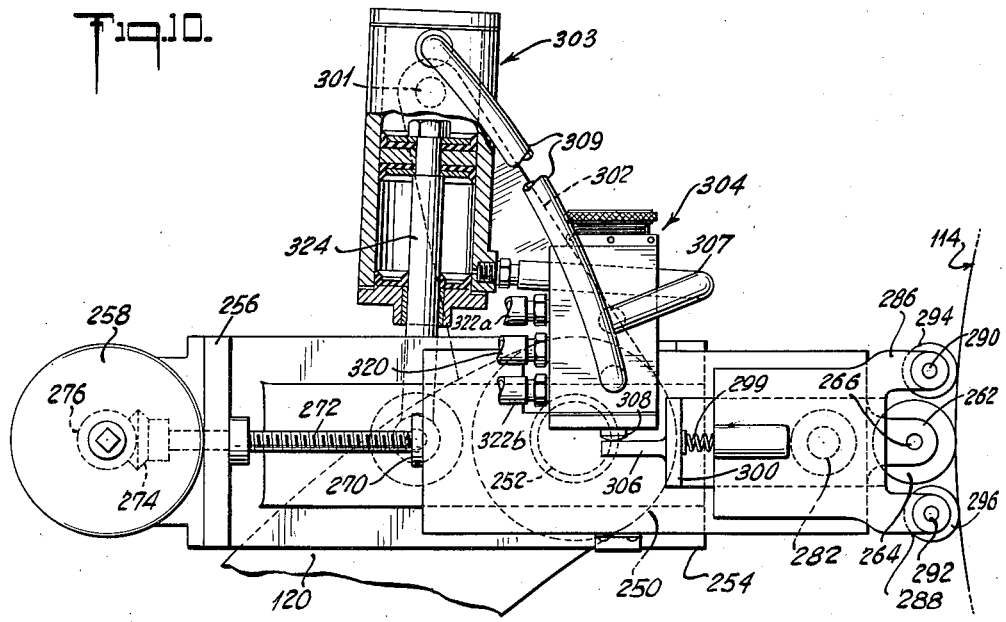
Figure 10 is a plan view of the template follower arm and follower mechanism.

The embodiment of the invention as shown herein comprises the support or base indicated generally by the numeral 10 substantially in crucifix form and comprising the projecting arms 10ᵃ, 10ᵇ, 10ᶜ and 10ᵈ. Above the central portion of the base or frame is the master turntable 12 mounted on a rotatable shaft 14 as best seen in Figure 6, and which is mounted in and extends through a slide indicated generally by the numeral 16, slidable in a vertical plane on a slideway 18 attached to vertical support member 19 rising from, and attached to, the central portion of the base member 10.

Disposed above each of the four branches of the support members 10ª, 10ᵇ, 10ᶜ and 10ᵈ respectively are a number of turntables 20. Since all of the turntables of all of the support branches are similarly mounted a description of the mounting and actuating means for one will suffice for all. As will best be seen by reference to Figure 4 each turntable 20 is mounted upon a rotatable shaft 22, rotated as will be described to impart rotative movement to the turntable, and the rotatable table and its shaft 22 are mounted in a vertical slide member indicated generally by the numeral 24 which is slideable vertically on the slideways 26 comprised by support means 28 projecting upwardly from, and attached to, the base portion 10ª.

Rotational movement is imparted to the shaft 14 of the master turntable 12 by the worm wheel 30 fixed on shaft 14 and driven by worm 32 which is mounted on the shaft 34 (Figures 6 and 7) and which is rotated by means of synchromotor 36.

Shaft 14 is mounted in upper and lower bearings 38 and 40 comprising part of the slide 16, and movement of the whole slide assembly in a vertical plane is transmitted through an internally threaded nut 42 which travels on the threaded shaft 44 mounted for rotation between the brackets 46 and 48 projecting laterally from the upwardly extending portion of vertical support member 19. Rotary motion is imparted to shaft 44 through the bevel gear 50 thereon which meshes with bevel gear 52 on shaft 54 of synchro-motor 56.

Supported adjacent the lower end of shaft 14 is a cycle timing switch (commutator assembly) indicated generally by the numeral 58 which is driven by the rotation of shaft 14 through sprocket 60, chain 62 and sprocket 64 on cycle timing switch shaft 65.

The slides 24 on which the work piece turntables 20 are supported are each actuated for movement in a vertical plane by a pair of internally threaded nuts 66, each of which travels on the threaded shaft 68 which is mounted for rotation in the bracket 70 projecting from the support means 28. On shaft 66 is the bevel gear 72 which is driven from bevel gear 74 on shaft 76 rotated by synchro-motor 78.

Rotatable shaft 22 for each turntable 20 has on its lower end the worm wheel 80 which is rotated by worm 82 mounted on shaft 84 which is driven by synchro-motor 86.

Mounted on the turntable 20 as by screws 88 is the work receiving holder 90 in which a work piece 92, such for example as is indicated in Figure 4, is inserted and held while being ground down to size as will be described. As shown herein the work piece 92 is an air foil or blade which may be grooved at its lower end to engage corresponding grooves in the work receiving member 90 into which it may be inserted edgewise. As shown herein means are provided for contacting the upper end of the air foil or blade and to hold it upon its work piece and prevent lateral displacement while it is being it is being ground said means comprising a bracket 94 projecting upwardly from the slide 24 and having at its upper end a slideway 96 in which a slide 98 is adjustably positioned as by means of thumb screw 100.

Surrounding the turntable is a receptable or receiving pan 102 for a cooling liquid which may be supplied to each grinding wheel through a nozzle 104 of conduit 106 which is attached to a manifold 107 through which cooling liquid is pumped from sump 108 by means of pump 110, and returned from receptacle 102 to said sump 108 through conduit 112.

Upon the master turntable 12 a master template 114 is provided comprising an upper portion 114ª the contour of which is to be reproduced in the work pieces 92, and a lower portion 114ᵇ having a laterally projecting flange 114ᶜ secured to the turntable as for example by means of bolts 116. Template 114 is a facsimile of the desired product but is preferably proportionately larger. As shown in Figure 16 the dotted line 115 indicates a template proportionally greater than the work piece 92, being contacted by a follower wheel 117 proportionally greater than the grinding wheel 146. However, in order to facilitate travel of the follower wheel around the template and particularly its sharp bends or edges, and to provide additional rigidity for the template, the template is built up by material added uniformly around its periphery to the increased size indicated by the numeral 114 and the radius of the follower wheel is similarly decreased as indicated by the numeral 117ª.

Mounted above the base member 10 are a number of pantograph arms indicated generally as 118, equal in number to the number of banks of work piece turntables, which is illustrated herein are four in number. Each pantograph arm has its inner end follower means adapted to follow the contour of the master template and adjustable toward or away from the master template as is described below. Each pantograph arm comprises the portion 120 pivoted intermediate its ends on the stud 122 projecting upwardly from column 124 which in turn rises from, and attaches to, base member 10. Pivotally mounted to the outer end of arm portion 120ª by the yoke 126 and pin 128, is the connecting arm 130 which may be automatically lengthened as will now be described. The outer end of arm 130 is pivotally connected by yoke 133 and pin 131, to the connecting link 134. Rotation of the pantograph arm causes reciprocation of link 134, and actuated by movement of link 134 are the bell crank members 136 equal in number to the work piece turntables 20, each having a bifurcated end 136ª pivotally engaged engaged by said yoke 133 and pin 131 and being pivoted intermediate its ends on a stud 138 projecting upwardly from column 140 which extends upwardly from the support means 28 (Figure 4). Each link 134 is pivotally connected at its inner end to the piston rod 135 extending from a piston member 137 contained in an air cylinder 139 which is pivotally attached at its inner end by pivot 141 to the bracket 143 rising from support means 28 on base support member 10ª. Cylinder 139 is connected to a source of compressed air to keep the follower in contact with the master template.

It may be noted that the distance from the pivot 138 of a bell crank arm 136 to the center of the shaft 144 supporting a grinding wheel 146 is in the same ratio to the length of the pantograph arm portion between its pivot 122 and the pivot 252 of the follower wheel mechanism as the ratio of the blade being ground to the master template. And the distance from follower arm pivot 122 to pivot pin 128 is equal to the distance between pivot 138 of the bell crank 136 and the pivot pin 131. The pantograph portion 122—252 is parallel to the grinding wheel arm portion 138—144, and similarly portion 122—128 of the pantograph arm is equal in length and parallel to the grinding wheel arm portion 138—131.

Mounted at the outer end of each bell crank 136 is a hollow bushing 142 (Figures 17–20) through which extends a shaft 144, on which a grinding wheel 146 is mounted, shaft 144 being driven from motor 148 through pulley 150 mounted on motor shaft 152, belt 154, and pulley 156 mounted on the rear end of grinding wheel shaft 144.

Figure 11:
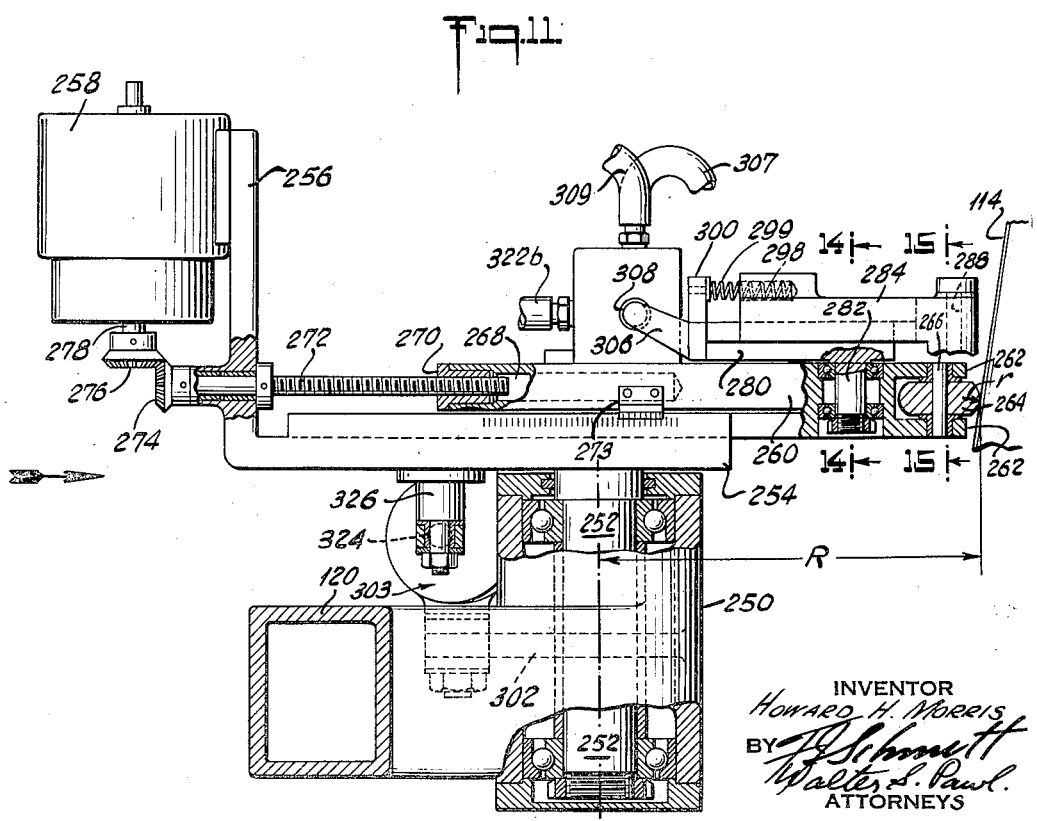
Figure 11 is a front view of Figure 10.

Integral with each bell crank 136 and positioned along one edge thereof (see Figure 18) is a slideway 160 on which is mounted the slide 162 which at one end supports the dressing tool 164 as will be described, and which adjacent its other end is provided with a bore 166 in which is positioned an internally threaded bushing 168 into which extends the externally threaded motor shaft extension 170 coupled to the shaft 172 of a synchro-motor 174 by the coupling 176 (see Figure 24b, Section D). It will be understood that as shaft 170 is rotated slide 162 will be moved to carry the dressing tool 164 toward or away from the grinding wheel 146. A vernier scale 178 may be provided along the slideway 160, as shown in Figure 18, to indicate the loss in diameter of the grinding wheel due to wear and honing, and for initially adjusting slide 162 (Figure 18) in relation to slide 260 (Figure 11).

The dressing tool 164 is rotatably mounted relative to slide 162, being fixed at the outer end of eccentric arm 180 which at one end is angularly formed and at its other end comprises a stud or pin 181 which is rotatably received in bushing 182 and which has secured at its outer end the hub 184 of arm 186 which in turn is connected to the piston shaft 188 of air cylinder 190. When air, by the operation of solenoid valve 191a (or 191b, 191c, or 191d, Figure 24, Section C) is introduced into cylinder 190, arm 180 is reciprocated as will be described, in an arcuate path causing the dressing tool to travel across the face of the grinding wheel to dress it.

The connecting arm portion 130 of each pantograph arm (see Figure 8) comprises three portions, namely, the tubular portion 196, the tubular portion 198, and the intermediate member 200 comprising the shoulder 202 from which the solid plug 204 extends in one direction into, and is force fitted in, member 198, and from which the shank portion 206 extends in the opposite direction through the portion 196, said portion 196 having a recess 208 surrounding the outer end of said shank. Within said recess is a collar 210 having a portion of reduced diameter 212 projecting outwardly from the flange portion 214, and surrounding said reduced portion, between the flange 214 and the inner end of said recess, is a coil spring 216. Said collar together with leather packing 218 and expanding washer 220 are secured around the inner end of said shank 206 by the nut 222. Spring 216 tends to urge the member 206 inwardly to bring the shoulder 202 of member 200 against the forward end of member 196 thus leaving an air chamber 223 within portion 196. Communicating with chamber 223 within member 196, behind the assembly of said collar, packing and washer, is a port 224 the outer end of which is threaded for coupling with a conduit 226 leading to a source of air through manifold 227 and the solenoid air valve indicated generally by the numeral 228. As air is supplied into the chamber 223 the said intermediate portion 198 comprising the shoulder 200, the plug 204 and the shank 206, will move to the right as viewed in Figure 8, thus causing separation of member 198 from member 196 and thereby lengthening the arm 130 against the force of spring 216. When air is exhausted from chamber 223 through conduit 226 by operation of valve member 228 the force of spring 216 will serve to return intermediate member 200 to its initial position carrying with it said portion 198 and thus shortening arm portion 130.

Arm 130 is lengthened periodically to swing bell crank members 136 and thereby cause the grinding wheels 146 to move away from their respective work pieces into position to be contacted by the dressing devices 164, and shortened to renew contact of the grinding wheels with the work pieces respectively. The frequency with which said arms 130 will be lengthened will be determined in each instance by the nature of the work and may be adjusted and controlled as desired through valve means 228 and the control means shown in Figure 3 (see also Figure 24a) and which is described below.

In Figure 10 there is shown one embodiment of follower means adapted to follow the contour of the master template 114. The said follower means is mounted on the inside end of pantograph arm 120. Said pantograph arm terminates at its inner end in a hub 250 in which is rotatably received the pivot stud 252 formed integrally with, and projecting at right angles to, the slideway 254 which includes the vertical arm 256 on which synchro-motor 258 is supported. Mounted in the slideway 254 is the slide member 260 and projecting from the front of said slide are the opposed ears 262 between which the follower wheel 264 is mounted as by means of the axial pin 266. Radius "R" (Figure 11) must always be in accurate ratio to corresponding radius of grinding wheels 146; and radius "r" of follower wheel 264 is in accurate ratio to radius on periphery of grinding wheels 146 (Figure 19).

The inner end of slide 260 is provided with a bore 268 in which is positioned the internally threaded bushing 270 which receives the forward end of threaded shaft 272, the other end of which extends through the slideway upright arm 256 and has on its inner extremity the bevel gear 274 which meshes with bevel gear 276 on the shaft 278 of synchro-motor 258. When synchro-motor 258 is actuated slide 260 is moved to carry the follower wheel 264 toward or away from template 114 depending upon the direction of rotation of synchro-motor 258. On slide 260 a vernier scale 273 is provided to indicate the extent of movement of slide 260 in the slideway 254.

Mounted for rotation on slide 260 is a slideway 280 having the downwardly projecting pivot stud 282 which is received within bearings provided within slide 260.

Mounted on slideway 280 is the slide member 284 which at its outer end has the pair of bearings 286 and 288 respectively disposed at right angles to the slide 284 and supporting pivot pins 290 and 292 on the lower extremities of which are mounted the follower wheels 294 and 296, which, as shown, are somewhat smaller in diameter than the follower wheel 264 and are aligned with the follower wheel 264 (see Figure 15).

The rear end of slide 284 is bored providing a recess 298 and received in said bore is one end of a coil spring 299 the other end of which is fixed to the arm 300 rising vertically from slideway 280. Said spring 299 thus tends to urge slide 284 to constantly maintain wheels 294 and 296 in contact with the master template 114 for the purpose of maintaining the center line of slide 260 accurately perpendicular to a line that is tangent to the surface of template 114 upon which follower roller 264 bears.

When slideway 280 becomes angularly related to the slide 260 (due for example to a sharp bend in the profile of the template), the angular position of said slideway is instantly corrected by a servo-hydraulic actuating cylinder 303 pivotally mounted on a stud 301 projecting from bracket extension 302 of arm 120 (Figures 10 and 12) controlled by a servo-control valve 304 (Figure 13) which is of well known kind and which is actuated as follows: projecting rearwardly from slideway 280 is the arm 306 which is in contact at all times with the end of actuating pin 308 which extends through one end of the servo-valve 304 and is urged outwardly by the spring member 310. Within servo-valve 304 and connected to pin 308 is a piston 312 having the radial flanges 314 and 316 which divide the valve member into three chambers. Fluid is supplied to and from valve 304 from pump 318, actuated by motor 319, through conduits 320 and 322 the latter of which comprises branches 322ª and 322ᵇ, and from valve 304 to one side or the other of piston 305 within cylinder 303 through conduit 307 or 309 depending upon the position of piston 312 in valve 304. When the angular position of slideway 280 is such that its center line is aligned with the center line of slide 260 piston 312 within valve 304 remains in a "neutral" position, and there is no movement of piston 305 in cylinder 303. However, when this alignment is disturbed it is restored as follows: the change in pressure on pin 308 exerted through arm 306 causes a change in the position of piston 312 within valve 304 thereby causing a corresponding change in the position of piston 305 in cylinder 303, thereby actuating piston rod 324, the outer end of which is connected to stud 326 projecting from slideway 254, and thus swinging said slideway on its pivot stud 252 until the center line of slideway 254 is aligned with the center line of slide 284.

Thus by actuation of synchro-motor 258 the follower slide 260 and follower wheel 264 may be moved toward or away from template 114 and thus maintain the length of radius "R" (see Figure 11) in accurate ratio to corresponding radius of grinding wheels 146; and by action of motor 319 hydraulic cylinder 303 may be actuated to restore alignment between slideway 254 and slide 284 and thus maintain center line of slide 260 accurately perpendicular to a line that is tangent to the surface of template 114 upon which follower roller 264 bears.

The cycle timing switch 58 referred to above comprises shaft 240 which has mounted thereon the three commutator disks 240ª, 240ᵇ, and 240ᶜ. (Figure 21).

Shaft 240 is driven from shaft 65 (which is driven from shaft 14 as described above). Shaft 65 has on its other end a gear 241 which through its intermediate gear 243 actuates gear 245 on shaft 240. The upper commutator disk 240ª has thereon a contact segment 247, (see Figure 24ª, Section "C"), which as the shaft 240 revolves makes contact periodically with the brush 249 connected to lead 411, and a contact ring 251 which is in continuous contact with brush 253 which is connected to lead 412ª. Similarly commutator disk 240ᵇ has thereon the contact segment 255 which is contacted periodically by brush 257 which is connected to the lead 410, and a contact ring 263 which is in continuous contact with brush 265 which is connected to lead 413. Similarly commutator disk 240ᶜ has thereon the contact segment 267 which as shaft 240 revolves makes contact periodically with brush 269 which is connected to the lead 415, and contact ring 275 which is in continuous contact with brush 277 which is connected to lead 412ᵇ. The function of the cycle timing switch is described further in connection with the wiring diagram, Figure 24, and Figures 2, 3 and 23, respectively.

As shown in Figure 2 a source of compressed air 229 is connected through reducing valve 231 and solenoid air valve 191ª (see Figure 24ª) to the manifold 235, and through branch conduits 237 to the cylinders 199, which, as shown in Figure 20, are connected to the dresser tool arms 186 of one bank or series for rotating the dressing tools 164 carried by said arms respectively, and causing them thereby to effect the dressing operation. The solenoid air valve 191ª is controlled by relay 418 (see Figure 24ª) which is connected with the commutator ring 240ᶜ by leads 415 and 412ᵇ from transformer 408.

As shown in Figure 3 a source of compressed air 230 is connected through conduit 232 and reducing valve 234 and solenoid air valve 228 and conduit 232ª to the manifold 227, and through branch conduits 226 to the air chambers 223 in connecting arm 130 attached to the pantograph arms 120. As shown in Figure 24ª, Section "C," solenoid valve 228 is energized through magnetic contactor 416 which is controlled by relay coil 414, relay 414 being connected from lead 410 through relay coil 414, through lead 411 to commutator disk 240ª on shaft 240 of cycle timing switch 58 and through lead 412ª to line 412, 410 and 412 being opposite ends of the secondary of transformer 408.

Figure 23 shows the commutator disk 240ᵇ between leads 410 and 413 and energized from transformer 408, and connected through contactor unit 428 with the induction motor 438, variable speed unit 440, and synchro generators 442ª, 442ᵇ, 442ᶜ and 442ᵈ. See Figure 24ª, section "C" and Figure 24ᵇ, section "D".

*Wiring diagram*

Figures 24ª and 24ᵇ taken together show a wiring diagram for my machine. For convenience the diagram is divided into sections A, B, C, D, E, and F, defined by dotted lines and indicating parts of the diagram which relates respectively to: A, rotation of turntables; B, operation of vertical feed screws; C, sequence control of grinding wheel retraction and dressing operations; D, rotation of feed screws for operation of dressing tool feed mechanism and positioning of follower slide; E, rotation of grinding wheel motors; and F, rotation of motor on servo fluid supply pump and motors driving coolant pumps.

Incoming lines 330, 332 and 334 supply the machine with electrical energy from a suitable power source. These lines are connected to line side of device "SSW," which is a fused safety switch. The bottom or load side of this device has leads 338, 340 and 342 connected to it. These leads are the supply leads for all "Sec-

Section "A"

In Section "A," leads 338, 340 and 342 connect to studs on line side of 3-pole magnetic contactor 344. When start button 346 is depressed it completes the circuit supplying the coil "TT" which operates the said contactor. The three contacts marked 348 then close, to supply current through leads 350, 352 and 354 to the induction motor 356, which drives the variable speed unit 358, which in turn actuates and controls the rotor of synchro generator 360, which translates mechanical power to electrical energy which is transmitted through leads 362, 364 and 366 to synchro motor 36 which rotates the master turntable 12, and to synchro motors 86$^a$, 86$^b$, 86$^c$ and 86$^d$ which rotate the four series or banks of work piece turntables 20, shown in the embodiment of the invention described herein. At the same time, the auxiliary contact marked 367 closes to complete the holding circuit for coil "TT".

The normally-closed contacts 368 are thermally-operated contacts adjacent to heater elements 369 in the leads going out to the motor 356 and remain closed unless an overload or fault occurs to cause the motor to draw an excessive amount of current. Should this occur, these contacts would open and interrupt the circuit to the coil, causing the magnetic contactor 344 to drop open and remove power to the faulty equipment. Similar thermally-operated contacts are shown elsewhere in the circuit without separate reference since their function will be obvious.

Lines 338 and 340 also go to primary side of transformer 370. The secondary side of transformer 370 supplies the fields on synchro generator 360 and turntable synchro motors 36, and 86$^a$, 86$^b$, 86$^c$ and 86$^d$, through leads 372 and 374.

Section "B"

Leads 338, 340 and 342 also supply power to studs on magnetic reversing contactor 376. When "up" button 378 is depressed, the "FU," or up feed, coil circuit is completed and three main contacts 380 close to supply current from lines 338, 340 and 342 to lines 382, 384 and 386 respectively to rotate induction motor 388, which, through variable speed drive 390 actuates the rotor of synchro generator 392 to cause synchro motor 56, which operates the vertical feed screw 44 of the master turntable 12, and synchro motors 78$^a$, 78$^b$, 78$^c$ and 78$^d$, which operate the vertical feed screws 68 of the work piece turntables 20, to rotate in "up" direction. The auxiliary contact 394 on "FU" is also closed to complete the holding circuit for "FU" coil; maintaining contacts 380 as long as "up" limit switch 395 is closed. When upper limit of vertical travel is reached the "up" limit switch is operated. This opens normally closed "up" limit switch contact 395 to drop out the "FU" contactor which stops vertical feed "up." This also closes normally open up limit switch contact 395$^a$ to complete, the "FD," or down feed, coil circuit, if the "ARS" (automatic reversing switch) is closed; otherwise, the said vertical feed screw motors will remain at rest at the end of travel in "up" direction. If "ARS" is closed "FD" coil picks up to close the three main "FD" contacts 400, and this reverses the rotation of motor 388 driving the synchro generator 392 by supplying current from 338 to 386, 340 to 384, and 342 to 382. The said vertical feed screws then operate in "down" direction until the "down" limit of travel is reached when "down" limit switch 405 is opened and 405$^a$, normally open, limit switch closes, and the direction of travel is again reversed.

The operation when "down" push button 402 is first depressed, or when "stop" push button 404 is depressed, will be understood from the above description and Figure 24, and need not be described in detail.

Lines 338 and 340 also go to the primary side of transformer 406, the secondary side of which supplies the fields on synchro generator 392 and synchro motors 56 and 78$^a$, 78$^b$, 78$^c$ and 78$^d$ through leads 407 and 409.

Section "C"

From transformer 408 secondary comes the control power leads 410 and 412 between which are connected the commutator disks 240$^a$, 240$^b$, and 240$^c$ of cycle timing switch 58 (see Figure 21) and the solenoid valve 228 which supplies air to the portions 130 of the pantograph arms for lengthening them and the solenoid valves 191$^a$, 191$^b$, 191$^c$ and 191$^d$ (see also Figure 3), operating the four series of dressing tools associated respectively with the grinding wheels 146 of the four series of grinding wheels for the work pieces on the four series or banks of turntables 20. Coil 414, which is a pilot relay on retraction air valve 228, is energized whenever both contact segments 247 and 251 on commutator disk 240$^a$ are under their brushes. Whenever the circuit through this coil is closed it closes contact 416 thus causing the portion 130 of the pantograph arms shown in Figure 8 to be lengthened to free the grinding wheels 146 from the work pieces preliminary to the wheel dressing operation.

Coil 418, which is the pilot relay on the dresser mechanism solenoid valves 191$^a$, 191$^b$, 191$^c$ and 191$^d$, is energized whenever both commutator segments on commutator disk 240$^c$ of cycle timing switch 58 are under their brushes. Whenever the circuit through coil 418 is closed it closes the contacts 420, 422, 424 and 426 to energize the said solenoid valves 191$^a$, 191$^b$, 191$^c$ and 191$^d$.

Commutator disk 240$^b$ completes the circuit to the magnetic contactor unit 428 shown in Section "D".

Section "D"

Commutator disk 240$^b$ completes the circuit to the coil "FN" of contactor unit 428 to close the contacts 430 when both contact segments of commutator disk 240$^b$ are under their brushes. When closed, contacts 430 supply current from main supply lines 338, 340 and 342 to lines 432, 434 and 436 which supply current to induction motor 438 which serves through the variable speed drive unit 440 to actuate synchro generators 442$^a$, 442$^b$, 442$^c$ and 442$^d$ which in turn actuate follower wheel feed screw motors 258$^a$, 258$^b$, 258$^c$ and 258$^d$; and synchro motors 174 (twenty-four as shown in Figure 24—six for each bank of dressing tools 164) for operating the dressing tool feed screws 170 (Figure 18).

Lines 434 and 436 also supply current to the brake release solenoid coil 444 on the shaft (variable speed drive shaft) of induction motor 438.

Between commutator disk 240$^b$ of Section "C" and the contactor unit 428 of Section "D" a manual switch 446 is connected and by operation of its three push buttons, 448 for normal feed, 450 for reverse, and 452 for "stop," manual control may be substituted for and given precedence over the commutator sequence control described above. For reverse operation push button 450 is manually closed causing coil "FR" to close the contacts 454 and causing current to be supplied from line 338 to lead 436, from line 340 to lead 434 and from line 342 to lead 432.

For transformer 460 lines 462 and 464 supply the fields on synchro generators 442ª, 442ᵇ, 442ᶜ and 442ᵈ, and synchro motors 258ª, 258ᵇ, 258ᶜ and 258ᵈ, and synchro motors 174.

Section "E"

When energizing the grinding wheel motors 148 (equal in number to the number of grinding wheels) current is supplied from the main supply lines to a magnetic contactor unit 470. Coil "GD" is energized by depressing "start" push button 472 which causes the contacts 474 to close and thereby supply current from main supply line 338 to lead 476; from main supply line 340 to lead 478; and from main supply line 342 to lead 480, thereby supplying current to the grinding wheel motors 148. The circuit through coil "GD" remains energized until "stop" push button 482 is depressed.

Section "F"

The motor 319 which operates pump 318 supplying fluid to servo-valves 304 (see Figures 11, 12 and 13) is started by closing manual circuit breaker 490 from main supply lines 340 and 342 to motor leads 492 and 494. Pump 318 is shown (Figure 13) provided with manifolds 318ª to reduce the number of pumping units required.

The coolant pump motors 496ª, 496ᵇ, 496ᶜ and 496ᵈ (Figure 4) are started by closing fused safety switch 498 which supplies power from line 340 to lead 500 and from line 338 to lead 502 which supplies power to four individual circuit breakers 504, 506, 508 and 510, one for each pump, circuit breaker 504 being connected to motor 496ª by leads 512, 514, circuit breaker 506 being connected to motor 496ᵇ by leads 516, 518, circuit breaker 508 being connected to motor 496ᶜ by leads 520, 522, and circuit breaker 510 being connected to motor 496ᵈ by leads 524, 526. These circuit breakers are normally closed and open only on overload, or, are opened manually if it is desired to shut off the coolant on one or more bank of grinders.

The operation of my machine is as follows: after the master template and work pieces (shown herein as blades) are attached to their respective turntables, and the dressing tool slide 162 of Figure 18 and the main slide 260 of the follower wheel mechanism of Figure 11 are initially set to their proper relative positions, and the servo fluid supply pump motor 319 (Figure 13) has been started by the operator closing circuit breaker 490 (Figure 24ᵇ, Section "F"), and compressed air has been admitted to air cylinders 139 (see Figure 1), the operator starts the grinding head motors (see Figure 17) by depressing grinding wheel motors start button 472, and starts coolant pump motors 496ª, 496ᵇ, 496ᶜ and 496ᵈ (see Figure 4) by closing switch 498 (Figure 24ᵇ, Section "F"). The operator next starts rotation of the turntables 12 and 20 (supporting the master template and blades respectively) by depressing the turntables start button 346. This causes operation of a motor 356 which rotates synchro generator 360 through variable speed drive unit 358, and the synchro generator 360 causes synchronous rotation of the synchro motors 36 and 86ª, 86ᵇ, 86ᶜ and 86ᵈ that rotate the various turntables (see Figure 1). The operator then depresses push button 378 or 402 for up or down movement of the vertical slides that support the turntables 12 and 20 of the master template and the work pieces respectively. This causes operation of a motor 388 which rotates a synchro generator 392 through a variable speed drive unit 390 and the synchro generator causes synchronous rotation of synchro motors 56 and 78ª, 78ᵇ, 78ᶜ and 78ᵈ that rotate the feed screws 44 and 68 that operate the vertical feed of the master and work piece turntables. The direction of the vertical feed is selected by the operator, by pushing the "up" feed button 378 or the "down" feed button 402 and such direction selection depends upon whether the blades are to be ground from the tips, toward the shanks, or vice versa. Assuming that, for the first grinding operation, the direction of feed is from the blade tips toward the blade shanks, then for the second operation the direction of feed would be reversed and would be from the blade shanks toward the blade tips, and the direction of feed would be reversed for each succeeding grinding operation. Suitably positioned limit switches 395 and 405 (see Figures 6, 7 and 24), automatically stop, or, stop and reverse, the direction of rotation of motor 388 which in turn reverses direction of rotation of synchro generator 392 and causes reverse rotation of the synchro motors 56 and 78ª, 78ᵇ, 78ᶜ and 78ᵈ.

The operation of the grinding wheel dressing mechanism is controlled automatically by the commutator disk 240ᶜ of cycle timing switch 58 (see Figure 6, and Figures 21 and 22) the shaft 65 of which is rotated at the desired speed from the vertical shaft 14 of the master template turntable. The desired number of revolutions of the cycle timing switch means in relation to the revolutions of the master template turntable, in actual practice, will have to be determined by experiment and will depend upon how often the grinding wheels will require dressing in relation to a revolution of the blade being ground. The desired revolutions of the cycle timing switch in relation to the master template turntable are readily obtainable by varying the ratio of the sprocket wheels 60 and 64 that drive the cycle timing switch (Figure 6), and/or by varying the ratio of the gears 241, 243 and 245 shown by Figures 21 and 22. The automatic operation of the grinding wheel dressing mechanism is described below. The entire operation should be performed as rapidly as practicable, so as to minimize the period of time that grinding wheels are out of contact with blades being ground.

When contact segment 247 of the upper commutator disk 240ª makes contact with its brush 249, air is automatically admitted to the air chambers 223 in the pantograph arm portions 130 (Figure 8), thus causing this arm portion to lengthen and thereby swing the grinding wheels 146 clear of the work being ground. The contact segment 247 of this commutator disk is sufficiently long to prolong this step until the two subsequent steps in the wheel dressing operation are completed.

The contact segment 255 of the middle commutator disk 240ᵇ then rotates into contact with its brush 257. This causes motor 438, driving through a variable speed unit 440, to rotate the four synchro generators 442ª, 442ᵇ, 442ᶜ and 442ᵈ; and each generator, in turn causes synchronous rotation of synchro-motors 174 rotating feed screws 170 that move the slides 162 supporting grinding wheel dressers toward the grinding wheels 146 to be dressed (see Figures 18 and 23);

and of synchro motors 258ª, 258ᵇ, 258ᶜ and 258ᵈ, which operate feed screws 272 to move the main slide 260 of the follower wheel mechanism (Figure 11) away from the master template 114 an amount proportionate to the wear of the grinding wheels. (Assuming that the ratio between the master template and the blade being ground is 10:1, the relative movement of the two aforementioned slides will also be 10:1.)

Immediately after the preceding operation is completed, the contact segment 267 of the lower commutator disk 240c makes contact with its brush 269 which energizes solenoid-operated air valves 191ª, 191ᵇ, 191ᶜ and 191ᵈ, and thereby causes air to be admitted to the air cylinders 190 shown by Figures 2 and 17, thereby causing the wheel dressers 164 to dress the grinding wheels 146. When the contact segment 267 of the commutator disk 240c revolves past its brush 269 the solenoid-operated air valves 191ª, 191ᵇ, 191ᶜ and 191ᵈ, are de-energized and automatically allow the air to exhaust from the air cylinders 190, permitting the wheel dressers to return to their normal positions, as shown by Figure 17.

When the above operation is completed, the contact segment 247 of the upper commutator disk 240ª revolves past its brush 249, and the solenoid-operated valve 228 involved is de-energized and allows the air to exhaust from the air chambers 223 in portions 130 of the pantograph arms (Figure 8), and said arms return (shorten) to normal length, permitting the grinding wheels to again make contact with the work being ground, and the cycle of operation is repeated automatically as long as master template turntable shaft 14 continues to rotate.

After the processed work pieces are removed from turntables 20, new work pieces to be ground may be attached to said turntable, and if they are different in shape or size from the ones previously processed a new master template 114 will be substituted on master turntable 12. Another grinding operation may then be initiated and performed as described above.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

The invention described herein may be manufactured and used by or for the Government of the United States of America for governmental purposes without the payment of any royalties thereon or therefor.

What I claim is:

1. A machine tool for simultaneously grinding several identical work pieces comprising a base having an enlarged central portion and an elongated arm projecting therefrom, a master template, supporting means for said master template mounted upon the enlarged central portion of said base, a plurality of supporting means for work pieces to be ground mounted at spaced intervals along said elongated arm, grinding wheels equal in number to said work piece supporting means movably mounted upon said elongated arm and positioned adjacent to the respective work piece supporting means, a follower movably mounted upon the central portion of said base adjacent to said master template and arranged to travel over its surface, means including a connecting arm interconnecting said follower and said grinding wheels for movement in unison toward or away from said template and said work piece supporting means respectively, means for driving said grinding wheels, and means for moving the respective supporting means for said template and said work pieces in synchronism relatively to said follower and said grinding wheels respectively, both horizontally and vertically.

2. The apparatus as claimed in claim 1, including means operable at predetermined intervals for simultaneously moving all of said grinding wheels out of engagement with their respective work pieces and into a retracted position for a short time interval, truing devices individual to each grinding wheel including support means for said truing devices individually, each said support means being movable relative to the grinding wheel with which it is associated and including means for swinging said truing device in an arcuate path, and control means for moving said support means to bring said truing devices into contact with the respective grinding wheels while they are in their retracted position and to swing said truing devices in an arcuate path around the periphery of the respective grinding wheels.

3. Apparatus as claimed in claim 2, wherein each grinding wheel is mounted on a corresponding support arm, and in addition, each support means comprises a slide to which each truing device is attached, said slides being mounted on the respective support arms, feed screws individual to said slides, said feed screws also being mounted on the respective support arms, and means for rotating said feed screws operative to advance and retract said slides.

4. Apparatus as claimed in claim 2, wherein each grinding wheel is mounted on a corresponding support arm, and in addition, each support means comprises a slide mounted on each said support arm, a member rotatably mounted in a bearing attached to each said slide and arranged to support a truing device therein, feed screws individual to said slides also mounted on the respective support arms, means for rotating said feed screws operative to advance and retract said slides, and separate means operative to impart reciprocative arcuate motion to said rotatably mounted truing device supporting members to cause the truing devices to swing in arcuate paths across the respective grinding wheels.

5. The device as claimed in claim 1 in which the follower is mounted on a slide and there is provided a slideway for the slide, means for advancing and retracting said slide, and synchromotor means for actuating said advancing and retracting means individually.

6. The device as claimed in claim 5 comprising also an auxiliary slide mounted on the follower support slide and comprising at its outer end two arms, rollers carried by said arms respectively and disposed so as to contact said template on opposite sides of said follower, said auxiliary slide being pivoted around an axis extending at right angles to the follower support slide, and means urging said rollers into contact with said template.

7. The device as claimed in claim 5 comprising also an auxiliary slide mounted on the follower support slide and comprising at its outer end two arms, rollers carried by said arms respectively and disposed so as to contact said template on opposite sides of said follower, said auxiliary slide being pivoted around an axis extending at right angles to the follower support slide, and spring means urging said rollers into contact with said template said follower support slide being pivotally mounted, a servo-hydraulic cylinder for rotating said main slide about its pivot, a servo-control valve for controlling said servo-hydraulic cylinder, and a lever projecting from said auxiliary slide and adapted when the center line of the auxiliary slide is moved angularly with respect to the center line of said main slide to actuate said servo-control valve causing the servo-hydraulic cylinder to revolve said main slide and restore the main slide to a position in which its centerline is aligned with the center line of the auxiliary slide and is perpendicular to a line tangent to said template.

8. The device as claimed in claim 5 comprising also an auxiliary slide mounted on the follower support slide and comprising at its outer end two arms, rollers carried by said arms respectively and disposed so as to contact said template on opposite sides of said follower, said auxiliary slide being pivoted around an axis extending at right angles to the follower support slide, and spring means urging said rollers into contact with said template said follower support slide being pivotally mounted, means for rotating said main slide about its pivot, other means for controlling said main slide rotating means, and a lever projecting from said auxiliary slide and adapted when the center line of the auxiliary slide is moved angularly with respect to the center line of said main slide to actuate said means for controlling said main slide rotating means causing said main slide rotating means to revolve said main slide and restore the main slide to a position in which its center line is aligned with the center line of the auxiliary slide and is perpendicular to a line tangent to said template.

9. The apparatus as claimed in claim 1, including means operable at predetermined intervals for simultaneously moving all of said grinding wheels out of engagement with their respective work pieces and into a retracted position for a short time interval, truing devices located adjacent to each of said grinding wheels and movable while said grinding wheels are disposed in their retracted position to bring the truing devices into contact with the grinding wheels to dress them simultaneously, and means individual to each truing device operative at the desired time to move said truing devices toward or away from their respective grinding wheels.

10. The device as claimed in claim 1 in which the template and follower are uniformly larger than the desired finished product and the grinding wheels respectively, and the movement of the template supports vertically is proportionately greater than the movement of the work supporting means respectively.

11. A device as claimed in claim 1 in which said connecting arm interconnecting said follower and said grinding wheels is variable in length, and means are provided for varying the length of said arm at timed intervals.

12. The apparatus as claimed in claim 1 in which the template is proportionately greater in size than the desired final product, and control means is provided whereby the movements of said template in a horizontal and in a vertical plane are proportionately greater than the corresponding movements of the work pieces respectively.

13. The device as claimed in claim 1 in which the said follower is adjustable in length, and means are provided for adjusting the length of said follower to maintain the effective radius of swing of said follower in relation to the radii of said grinding wheels.

14. The device as claimed in claim 1 in which the said follower is adjustable in length, and means are provided for adjusting the length of said follower in proportion to changes of the radii of the grinding wheels.

15. The device as claimed in claim 1 in which the length of said connecting arm may be modified, and means are provided for modifying its length at timed intervals.

16. The device as claimed in claim 1 in which said connecting arm comprises a telescopic portion, a fluid chamber within said portion, a source of fluid connected to said chamber, and means for causing the admission or discharge of fluid from said chamber at predetermined intervals to modify the length of said connecting arm.

17. A machine tool for simultaneously grinding several identical work pieces comprising a base having an enlarged central portion and a plurality of elongated arms projecting therefrom, a master template, supporting means for said master template mounted upon the enlarged central portion of said base, a series of supporting means for work pieces to be ground mounted at spaced intervals along each said elongated arm, a series of grinding wheels equal in number to said work piece supporting means movably mounted upon each said elongated arm and positioned adjacent to the respective work piece supporting means, a plurality of followers equal in number to the number of said elongated arms movably mounted upon the central portion of said base in spaced positions adjacent to said master template and arranged to travel over its surface, means including a connecting arm interconnecting each said follower and one series of grinding wheels for movement in unison toward or away from said template and said work piece supporting means respectively, means for driving said grinding wheels, and means for moving the respective supporting means for said template and said work pieces in synchronism relatively to said follower and said grinding wheels respectively, both horizontally and vertically.

18. A machine tool for simultaneously grinding several identical work pieces comprising a master template, supporting means for said master template, a plurality of supporting means for work pieces to be ground, grinding wheels equal in number to said work piece supporting means and positioned adjacent to the respective supporting means, a follower located adjacent to said template and arranged to travel over the surface of said template, means including a connecting arm interconnecting said follower and said grinding wheels for movement in unison toward or away from said template and said work piece supporting means respectively, means for moving the respective supporting means for said template and said work pieces in synchronism relatively to said follower and said grinding wheels respectively, both horizontally and vertically, means for driving said grinding wheels, a wheel dressing device mounted adjacent to each said grinding wheel, and means operable at predetermined intervals for simultaneously moving all of said grinding wheels out of engagement with their respective work pieces and into engagement with their respective dressing devices to dress the surfaces of said grinding wheels.

19. The device as claimed in claim 18 in which each grinding wheel dressing device is mounted on a slide and there is provided a slideway for each slide, means for advancing and retracting each slide, and synchro-motor means for actuating said advancing and retracting means individually.

20. A machine tool for simultaneously grinding several identical work pieces comprising a base, a master template, supporting means for said master template movably mounted upon said base, a plurality of supporting means for work to be ground also movably mounted upon said base, grinding wheels equal in number to said work piece supporting means mounted upon said base and positioned adjacent to the respective work piece supporting means, a follower mounted upon said base adjacent to said master template and arranged to travel over its surface, linkage means interconnecting said follower and said grinding wheels for movement in unison toward or away from said template and said work piece supporting means, means for driving said grinding wheels, means for moving the respective supporting means for said template and for the work pieces in synchronism relatively to said follower and said grinding wheels respectively, both horizontally and vertically, biasing means for maintaining said follower and said grinding wheels against said template and the work pieces carried by said work piece supporting means respectively during grinding operations, said biasing means including an air cylinder mounted upon said base and operatively connected to the linkage means interconnecting said follower and said grinding wheels, and means incorporated in said linkage means operative periodically to change the length of said linkage means to move said grinding wheels out of engagement with their respective work pieces without disengaging said follower from said template.

21. A machine tool for simultaneously grinding several identical work pieces comprising a base having an enlarged central portion and an elongated arm projecting therefrom, a master template, rotatable supporting means for said master template mounted upon the enlarged central portion of said base, a plurality of other rotatable supporting means for work pieces to be ground mounted at spaced intervals along said elongated arm, means for rotating said supporting means in synchronism, grinding wheels equal in number to said work piece supporting means pivotally mounted upon said elongated arm and positioned adjacent to the respective work piece supporting means, a follower pivotally mounted upon the central portion of said base adjacent to said master template and arranged to travel over its surface, means interconnecting said follower and said grinding wheels for moving said follower and said grinding wheels respectively in unison toward or away from said template and work pieces on said work piece supporting means respectively, and means for raising and lowering said template supporting means and said work piece supporting means simultaneously and proportionately.

22. The device as claimed in claim 21 in which the said means interconnecting said follower and said grinding wheels is extensible, means for exerting pressure lengthwise of said interconnecting means to extend it and thereby move the grinding wheels out of contact with said work pieces without moving said follower from said template, and control means for exerting said pressure and relieving said pressure at predetermined intervals.

HOWARD H. MORRIS.

REFERENCES CITED

The following references are of record in the file of this patent:

UNITED STATES PATENTS

| Number | Name | Date |
|---|---|---|
| 1,363,238 | Duchemin | Dec. 28, 1920 |
| 1,840,231 | Harrison et al. | Jan. 5, 1932 |
| 2,102,505 | Berthiez | Dec. 14, 1937 |
| 2,151,743 | Chladek | Mar. 28, 1939 |
| 2,445,971 | Rosen | July 27, 1948 |
| 2,506,264 | Borrup | May 2, 1950 |

FOREIGN PATENTS

| Number | Country | Date |
|---|---|---|
| 866,210 | Great Britain | July 15, 1941 |